(12) United States Patent
Khoury

(10) Patent No.: US 9,973,285 B1
(45) Date of Patent: May 15, 2018

(54) FREQUENCY SHAPING NOISE IN A DC-DC CONVERTER USING PULSE PAIRING

(71) Applicant: Silicon Laboratories Inc., Austin, TX (US)

(72) Inventor: John M. Khoury, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 0 days. days.

(21) Appl. No.: 15/352,775

(22) Filed: Nov. 16, 2016

(51) Int. Cl.
| H04B 14/02 | (2006.01) |
| H02M 3/04 | (2006.01) |
| H04B 1/12 | (2006.01) |
| H02M 1/44 | (2007.01) |

(52) U.S. Cl.
CPC ............ *H04B 14/026* (2013.01); *H02M 1/44* (2013.01); *H02M 3/04* (2013.01); *H04B 1/123* (2013.01)

(58) Field of Classification Search
USPC .................................. 323/283, 284, 282, 252
See application file for complete search history.

(56) References Cited

U.S. PATENT DOCUMENTS

| 6,577,110 | B2 * | 6/2003 | Van Auken | ......... | H02M 3/1588 |
| | | | | | 323/224 |
| 8,901,908 | B2 * | 12/2014 | Tang | ..................... | H02M 3/157 |
| | | | | | 323/283 |
| 9,698,685 | B2 * | 7/2017 | Calhoun | ............... | H02M 3/158 |
| 2007/0216378 | A1 * | 9/2007 | Ozawa | .................. | H02J 7/0068 |
| | | | | | 323/252 |
| 2008/0116872 | A1 * | 5/2008 | Nakazono | ............... | H02M 1/32 |
| | | | | | 323/284 |
| 2011/0267142 | A1 * | 11/2011 | Wismar | ................ | H02M 3/158 |
| | | | | | 330/129 |
| 2012/0126766 | A1 * | 5/2012 | Chen | ..................... | H02M 3/156 |
| | | | | | 323/283 |
| 2016/0233869 | A1 | 8/2016 | Khoury | | |

OTHER PUBLICATIONS

Steven Keeping, "The Advantages of Pulse Frequency Modulation for DC/DC Switching Voltage Converters", Electronic Products, Mar. 25, 2014, 4 pages.
Maxim Integrated Products, Inc., "DC-DC Convertor Tutorial", https://www.maximintegrated.com/en/app-notes/index.mvp/id/2031, Nov. 29, 2001, 14 pages.

* cited by examiner

*Primary Examiner* — Eva Puente
(74) *Attorney, Agent, or Firm* — Trop, Pruner & Hu, P.C.

(57) ABSTRACT

In one aspect, an apparatus includes: a pulse frequency modulation (PFM) voltage converter to receive a first voltage and provide a second voltage to a load; and a pulse generator. The PFM voltage converter may include an inductor to store energy based on the first voltage and a switch controllable to switchably couple the first voltage to the inductor. The pulse generator may be configured to generate at least one pulse pair to control the switch, where this pulse pair is formed of a first pulse and a second pulse substantially identical to the first pulse, where the second pulse is separated from the first pulse by a pulse separation interval, when the second voltage is less than a first threshold voltage.

20 Claims, 6 Drawing Sheets

FREQUENCY SHAPING NOISE IN A DC-DC CONVERTER USING PULSE PAIRING

BACKGROUND

A DC-DC converter is a form of voltage converter that receives input of a DC voltage and modifies it to output a DC voltage of a different voltage level. Different topologies of converters enable boost and buck operations. DC-DC converters are desirable to use in powering portable devices such as wireless devices, since they can reduce the current drawn from a battery power supply. Many types of DC-DC converters exist, including pulse width modulation (PWM) converters and pulse frequency modulation (PFM) converters. Different converters may be preferable for certain applications. For example a PFM converter maximizes efficiency over a wider range of load currents than does a PWM DC-DC converter. However, one drawback of a PFM converter is that its switching operations can cause interference in radio frequency (RF) circuits that is difficult to control, since the interfering energy is spread over wide and unpredictable frequency bands.

SUMMARY OF THE INVENTION

In one aspect, an apparatus includes: a pulse frequency modulation (PFM) voltage converter to receive a first voltage and provide a second voltage to a load; and a pulse generator. The PFM voltage converter may include an inductor to store energy based on the first voltage and a switch controllable to switchably couple the first voltage to the inductor. The pulse generator may be configured to generate at least one pulse pair formed of a first pulse and a second pulse substantially identical to the first pulse, where the second pulse is separated from the first pulse by a pulse separation interval, when the second voltage is less than a first threshold voltage. The at least one pulse pair may control the switch, and the pulse separation interval can be a predetermined value determined without reference to a determination that the second voltage is less than the first threshold voltage.

The pulse separation interval may be based at least in part on a frequency of a mixing signal output by a local oscillator (LO) of the apparatus. The apparatus may be a radio receiver to receive and downconvert a radio frequency (RF) signal to a second frequency signal using the mixing signal. In an embodiment, the pulse separation interval is according to: $N/2f_{LO}$, where N is an odd integer and $f_{LO}$ is the mixing signal frequency. In another embodiment, the pulse separation interval is according to: Round($N(1+f_{IF}/f_{LO})$), where N is an odd integer, $f_{IF}$ is an intermediate frequency, and $f_{LO}$ is the mixing signal frequency. The first pulse pair may reduce interference of the first pulse and the second pulse substantially around one or more of the mixing signal frequency and the RF signal. More specifically, the second pulse is to cancel the interference of the first pulse substantially around the one or more of the mixing signal frequency and the RF signal. The pulse generator may generate a plurality of pulse pairs, until the second voltage exceeds a second threshold voltage, where the second threshold voltage is greater than the first threshold voltage.

In an embodiment, the apparatus includes a storage to store a table having a plurality of entries each to associate a RF frequency with a pulse separation interval. The apparatus may further include a control logic to: access the table based at least in part on identification of a requested RF channel to determine the pulse separation interval; and control the pulse generator using the pulse separation interval. The pulse generator may further be configured to generate a second pulse pair formed of a third pulse and a fourth pulse, the fourth pulse separated from the third pulse by the pulse separation interval, where a time duration between the at least one pulse pair and the second pulse pair is based on the second voltage and is not a predetermined value.

In another aspect, at least one computer readable storage medium includes instructions that when executed enable a system to: responsive to a determination that a load voltage provided to a RF circuit from a DC-DC converter is below a first threshold voltage, generate a first pulse of a switching signal and a second pulse of the switching signal, the second pulse separated from the first pulse by a pulse separation interval; and send the first pulse of the switching signal and the second pulse of the switching signal to a switch of the DC-DC converter to enable a source voltage to be coupled to an inductor of the DC-DC converter, where the pulse separation interval is based at least in part on a desired channel frequency and not responsive to the determination that the load voltage is below the first threshold voltage.

In an embodiment, the system may calculate the pulse separation interval based at least in part on a frequency of a local oscillator signal output by a local oscillator of the RF circuit. In another embodiment, the system may calculate the pulse separation interval further based on an intermediate frequency to which an RF signal of the desired channel frequency is downconverted by the local oscillator signal. The system may access a lookup table based on the desired channel frequency to determine the pulse separation interval. In an embodiment, the system may generate a third pulse of the switching signal and a fourth pulse of the switching signal responsive to a determination that the load voltage is above the first threshold voltage and below a second threshold voltage and send the third pulse of the switching signal and the fourth pulse of the switching signal to the switch of the DC-DC converter. This third pulse may be separated from the second pulse by a time duration different than the pulse separation interval.

In another aspect, an integrated circuit includes: a radio receiver to receive, process and downconvert a RF signal including an RF channel of interest to a second frequency signal using a mixing signal; a digital processor to digitally process the second frequency signal; and a DC-DC converter including a storage device.

The DC-DC converter may be configured to provide a voltage to the radio receiver, where the DC-DC converter includes a control circuit, when the voltage is less than a threshold voltage, to generate at least one pulse pair formed of a first pulse and a second pulse substantially identical to the first pulse. This second pulse may be separated from the first pulse by a pulse separation interval, to cause a source voltage to charge the storage device. In turn, the pulse separation interval may be a predetermined value based at least in part on one or more of the RF channel of interest and the mixing signal, where the pulse pair is to reduce interference at one or more of the RF channel of interest and the mixing signal.

In an embodiment, the integrated circuit may further include a storage to store a table having a plurality of entries each to associate a RF channel of interest with a pulse separation interval. The control circuit may be configured to access the table based at least in part on the RF channel of interest to determine the pulse separation interval.

DETAILED DESCRIPTION

In various embodiments, control techniques are provided to reduce or remove interference at RF bands of interest caused by switching of a DC-DC converter. More specifically, embodiments may control PFM pulses by way of modest timing restrictions, so as to create one or more notches in a frequency spectrum at a specified frequency or range of frequencies. Specifically, in a preferred embodiment, a PFM DC-DC converter is controlled to not output a single pulse of a switching signal, but always to output at least a pair of pulses that have a predetermined delay interval between their start times.

Figure 1:
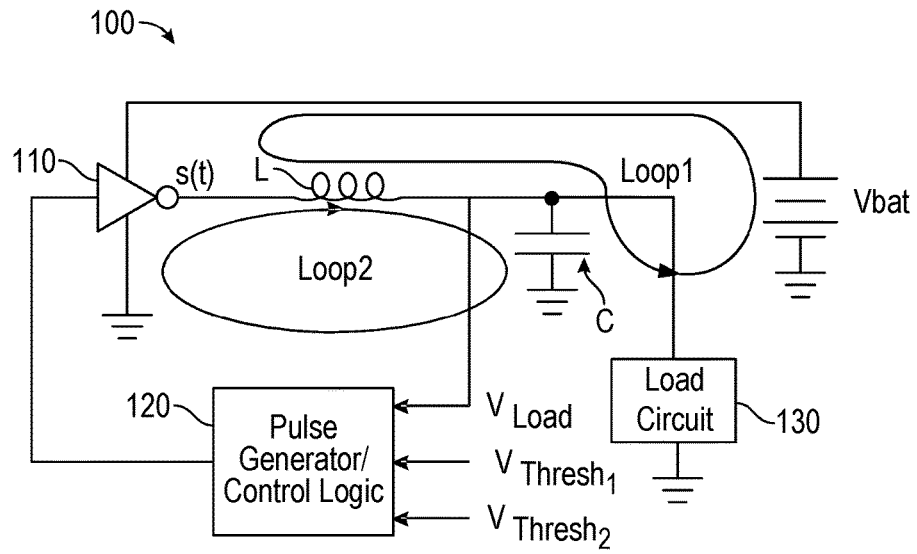
FIG. 1 is a schematic diagram of a DC-DC voltage converter in accordance with an embodiment.

Referring now to FIG. 1, shown is a schematic diagram of a DC-DC voltage converter in accordance with an embodiment. More specifically as shown in FIG. 1, voltage converter 100 is implemented as a DC-DC switching converter. Converter 100 may be adapted on-chip or off-chip depending upon implementation. To provide a load voltage ($V_{Load}$) to a load circuit 130 coupled in parallel with a capacitor C, a source voltage (which may be a battery voltage ($V_{Bat}$)) is applied through an inverter 110 to an inductor L to store energy in capacitor C.

In various embodiments, converter 100 is a pulse frequency modulation (PFM) DC-DC converter. To control the converter according to this PFM operation, a pulse generator/control logic (hereafter "control logic") 120 is provided. In various embodiments, control logic 120 is implemented as hardware circuitry, software and/or firmware and/or a combination thereof. In some cases, control logic 120 may be implemented as part of a controller such as a microcontroller. In some cases, the microcontroller may be a stand-alone small control unit of the switching regulator. In other cases, this controller may be implemented as part of a larger microcontroller, such as a given microcontroller for which switching regulator 100 provides power.

To effect operation such that the load circuit is provided with a substantially steady state DC voltage, control logic 120 compares the load voltage $V_{Load}$ to one or more threshold voltages, which may be based on values stored in a configuration storage. More specifically, control logic 120 is configured to provide a switching signal to inverter 110 to cause the source voltage ($V_{Bat}$ (which may be provided by an off-chip battery source)) to create an inductor current within inductor L to charge capacitor C, such that the load voltage increases.

In different embodiments, converter 100 may be implemented as a PFM regulator which is a particular form of a hysteretic voltage converter. As such, the switching signal may be controlled to cause inverter 110 to be switched on when the load voltage is below a second threshold voltage (namely a lower threshold voltage (shown in FIG. 1 as $V_{Thresh2}$)) and continue this switching on of inverter 110 using a multi-pulse technique as described herein until the load voltage exceeds a first threshold voltage (namely a high threshold voltage, shown in FIG. 1 as $V_{Thresh1}$) greater than the second threshold voltage, to enable hysteretic operation.

Thus when inverter 110 is switched on, a charging loop is active such that current flows through Loop 1 to charge capacitor C. Instead when inverter 110 is switched off, a discharge loop, Loop 2, becomes active and the remaining current in L is transferred to capacitor C. Understand while shown at this high level in the embodiment of FIG. 1, many variations and alternatives are possible. For example, instead of an inverter, another switching device such as one or more metal oxide semiconductor field effect transistors (MOSFETs) may be used to receive the switching signal to control switching of the source voltage to one or more energy storage devices of converter 100. One or more diodes also may be provided to control direction of current flow.

Figure 2A:
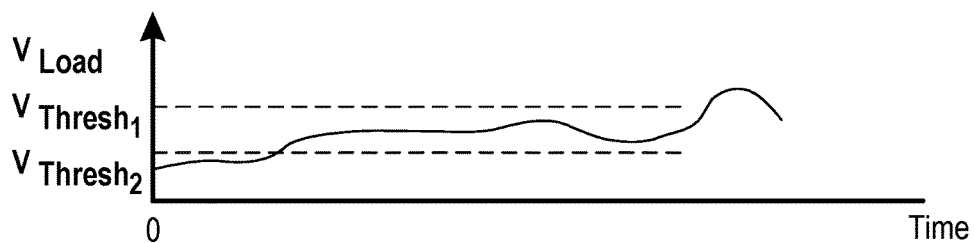
FIGS. 2A-2D are timing illustrations detailing operation of a DC-DC converter in accordance with an embodiment.

Referring now to FIGS. 2A-2D, shown are timing illustrations detailing operation of a DC-DC converter in accordance with an embodiment. As illustrated in FIG. 2A, a varying load voltage is shown over time. As seen, the voltage converter is controlled to maintain the load voltage between a lower threshold voltage level ($V_{Thresh2}$) and a higher threshold voltage level ($V_{Thresh1}$). By providing two threshold voltages, a measure of hysteresis is realized. However in other cases it is possible to control the voltage converter based on a single threshold voltage. In such cases, the switching regulator may be caused to operate in a charging cycle when the load voltage is below the single threshold, and instead operate in a discharging cycle when the load voltage exceeds the threshold.

Figure 2B:
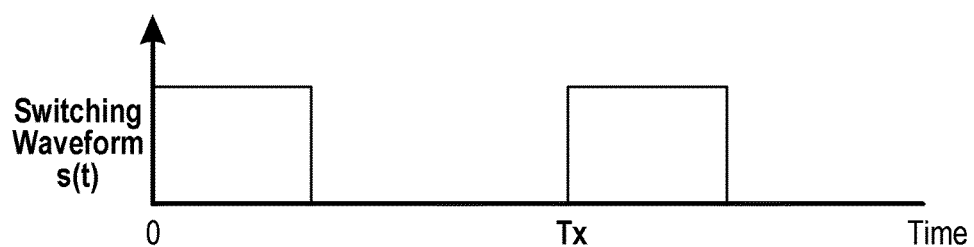

To effect this control a switching waveform s(t) is illustrated in FIG. 2B. As such, when control logic 120 determines that the load voltage is lower than the low threshold level, this switch signal is active to enable charging by way of the battery voltage (as illustrated in Loop 1 in FIG. 1). In embodiments, instead of a single pulse to effect this control, a pair of pulses, separated by a predetermined time value Tx, is used. Note that this time duration, referred to herein also as a pulse separation interval (PSI), is established to control spurious noise caused by the switching waveform to avoid interference at one or more frequencies, such as at a radio frequency (RF) frequency of a channel of interest. That is, embodiments may be used in a RF receiver and/or transmitter in which the DC-DC voltage converter is controlled to operate in a manner to reduce or avoid interference with an RF signal to be received in the RF receiver (and/or an RF signal to be transmitted from an RF transmitter).

Note that while only two pulses of the switching waveform are shown in FIG. 2B, in some cases additional pulses also separated by the same PSI may occur within a given control period. Further understand that in this PFM control of a DC-DC converter, an indeterminate time after such two or more pulses of the switching waveform may occur before another set of two or more pulses of the switching waveform occurs. The pulse width of these two pulses may be identical (or at least substantially identical) in this PFM control of the regulator. In contrast, other DC-DC converters are implemented with pulse width modulation (PWM) control in which the inductor is controlled in a continuous conduction mode (CCM), such that pulses are generated at an identified and fixed frequency, while pulse widths of the pulses of the switching signal may vary. This fixed frequency occurs regardless of the measured value of the output voltage of the switching regulator. That is, in contrast to a PFM converter as described herein, a PWM converter maintains a fixed control interval at which switching signals are initiated, albeit these signals may be of different pulse widths depending upon comparison of the output voltage to one or more threshold voltages.

Note that regardless of a load voltage that exists after a single pulse of the switching signal is generated, the second pulse of the series of two pulses is output, separated by Tx. Understand that after this series of (at least) two switching pulses, the load voltage may be determined to be above the appropriate threshold, such that no further issuance of two (or more) switching pulses occurs until the load voltage falls below a target threshold. Instead if, after the two pulses occur separated by the pulse separation interval, it is determined that the load voltage is still below the given target threshold voltage, another series of two pulses may occur. Note that this second series of two pulses may typically occur spaced from the second pulse of the first series of two pulses by an indeterminate time.

Figure 2C:
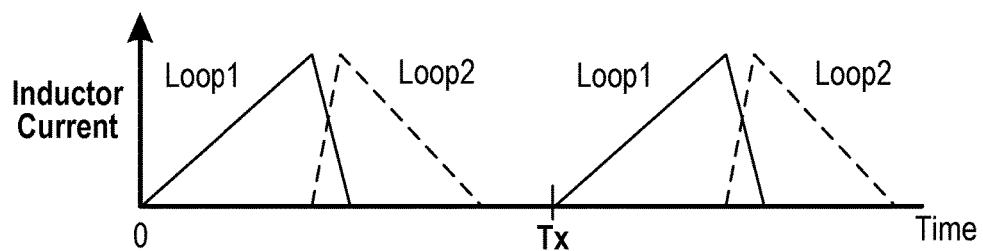

Still with reference to FIGS. 2A-2C, note that when the switching waveform s(t) is active, inverter 110 is enabled to cause the battery voltage to induce an inductor current $I_L$ in inductor L. In implementations of a PFM converter, as seen in FIG. 2C, when the battery voltage is applied when inverter 110 is enabled (and thus Loop 1 is active), the inductor current increases, e.g., linearly from an initial value of zero. That is, in embodiments the DC-DC converter operates in a substantially discontinuous conduction mode (DCM) of operation in which the inductor is controlled so that the inductor current collapses to zero and increases linearly therefrom in each cycle of operation. Thus as seen in FIG. 2C, while inverter 110 is enabled via an active switching waveform signal s(t), the inductor current increases. And when inverter 110 is disabled (and thus Loop 2 is active), the inductor current decreases to zero as the magnetic field of inductor L collapses.

Figure 2D:
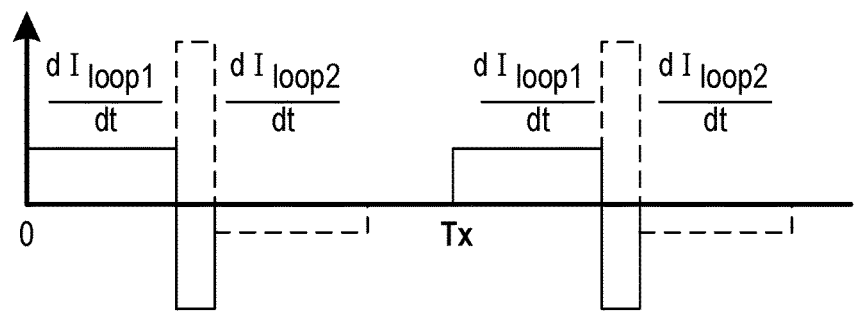

In turn, FIG. 2D illustrates the derivative of the loop currents. As illustrated, when Loop 1 is active (when inverter 110 is on), a substantially steady loop current pulse occurs, and when inverter 110 is disabled and Loop 2 is active, a negative impulse occurs. As to the derivative of the Loop 2 current, note that initially a positive-going pulse occurs with higher amplitude, and then a negative pulse of substantially smaller amplitude occurs. Similar pulses occur for the second pulse of the pulse pair, which occurs at time Tx (namely after a pulse separation interval) from the beginning of the first pulse.

By way of these multiple pulses that occur responsive to detection of a load voltage falling below a given threshold, switching in the DC-DC converter is controlled in a manner to achieve spectral nulls at a relevant RF frequency, such as at one or more of a center frequency of an RF channel of interest and/or a local oscillator (LO) frequency of a mixing signal used to downconvert the RF signal to a lower frequency signal (e.g., to downconvert the RF signal to an intermediate frequency (IF) signal).

In some cases the switching waveform can be controlled to cause the different pulse widths of the derivative current pulses shown in FIG. 2D to have specific characteristics to create spectral nulls at desired frequencies (e.g., at one or more of an LO frequency and an RF frequency for a channel of interest). However, such control may be difficult in practical implementations. This may be so, given that the pulse width of these derivative current pulses are of relatively short duration (e.g., potentially on the order of nanoseconds).

Instead, embodiments may reduce or remove RF interference triggered by switching operations of the DC-DC converter by controlling the pulse separation interval between pairs of these pulses, such that the noise created by the first pulse is cancelled by the noise created by the second pulse, leading to null energy at one or more frequencies of interest.

Figure 3A:
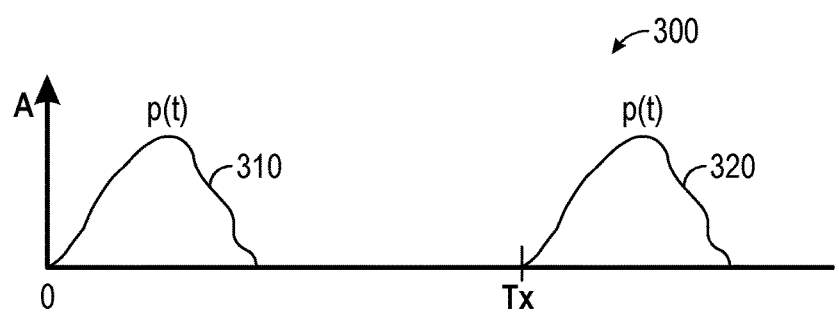
FIG. 3A is a graphical illustration of a pair of arbitrary pulses in accordance with an embodiment.

Referring now to FIG. 3A, shown is a graphical illustration of a pair of arbitrary pulses. Note that these arbitrary pulses are illustrated to show that any type of arbitrary pulse shape (such as the square wave switching signal provided to one or more switches of a DC-DC converter as used herein) can be used to effectively provide a null or notch at one or more desired frequencies. Specifically, FIG. 3A illustrates a pulse pair 300 including a first pulse 310 and a second pulse 320. Note that these arbitrary pulses (p(t)) may be any type of pulse shape. Furthermore, note that these pulses are generated at an interval corresponding to Tx, namely a pulse separation interval. The Fourier transform of the pair of identical pulses is:

$$P_{pair}(j\omega) = P(j\omega)^*[1+e^{-j\omega T_x}];$$

$$P_{pair}(j\omega) = 2P(j\omega)e^{-\frac{j\omega T_x}{2}}\cos\left(\frac{\omega T_x}{2}\right).$$

Forcing a notch at an LO frequency ($f_{LO}$) implies that:

$$\cos\left(\frac{\omega_{LO} T_x}{2}\right) = 0.$$

Or, for "n," being an odd integer:

$$T_X = \frac{n}{2f_{LO}}.$$

Note that for interference cancellation (e.g., notch generation) at $f_{LO}$, pulse pairings may be generated with a delay between pulses within a pair being an odd integer multiple of 2LO cycles, with accuracy much smaller than one LO cycle. As described above, shape, amplitude matching and timing of pulses within a pair may be much less critical than pulse pair delay separation, and delay accuracy is much easier to manage at sub-GHz than 2.4 GHz. With the above equations, as different radio channels are tuned, the LO changes and the notch in the PFM switching noise spectrum tracks, as desired.

Understand that the value of n can vary in different implementations, and may be set based at least in part on a frequency of interest. In example embodiments, n may be controlled to be between 2001 and 3001, and more specifically 2401, in one embodiment. Similarly, the pulse separation interval may be controlled to be between approximately 415 and 625 nanosecond (ns) when $f_{LO}$ is at 2.4 gigahertz (GHz). Note that in embodiments, the value of n may depend on the LO frequency and the minimum separation of pulses (i.e., the maximum switching rate of the DC-DC converter, which in an embodiment may be 2 MHz).

Minimizing Tx ensures that the cancellation occurs sooner. Ideally, Tx is much less than the symbol duration of the transmitted data so that the corruption and cancellation occurs entirely within a single symbol and hence has minimal effect on bit error rate. This restriction may be eased depending on the error correction coding of the system implementation. However note that Tx cannot be arbitrarily small, since the maximum switching rate of the PFM DC-DC converter is limited (i.e., individual pulses cannot be too close together).

Understand that while pulses 310 and 320 shown in FIG. 3A are substantially identical (as they may be generated by the same component and at similar circuit environment conditions), in other embodiments two or more pulses can be generated at a pulse separation interval in a manner to reduce or remove undesired interference at one or more RF frequencies. That is, in other cases pulses having different shapes and sizes (amplitudes) can occur, with a second or more of the pulses being generated in a manner with a different shape/amplitude than a first pulse in order to cancel undesired energy at these higher frequency bands.

Furthermore, while the above discussion as to FIG. 3A is in the context of selecting a pulse separation interval with regard to an LO frequency, in some cases a modification or perturbation of this value (e.g., with an IF frequency of a resulting downconversion) can occur to more effectively reduce or remove energy at an RF channel of interest. More specifically, the selection of the pulse separation interval may occur in a manner to ensure that a notch is realized at a given RF frequency (namely at a center channel of a desired RF channel (e.g., a center channel of a wireless band of interest for an associated radio receiver)). In this instance, a notch at RF frequency is desired (e.g., with high-side injection), and may be generated using a pulse separation interval calculated as follows:

$$Tx = \frac{n}{2(f_{LO} - f_{IF})},$$

$$Tx = \frac{n\left(1 + \frac{f_{IF}}{f_{LO}}\right)}{2f_{LO}},$$

where $f_{IF}$ is an intermediate frequency resulting from downconversion of an RF signal by the LO frequency.

In this case for high-side injection, the value of n to be used for generation of the pulse separation interval may be according to:

$$n_{RF} = \text{round}\left(n\left(1 + \frac{f_{IF}}{f_{LO}}\right)\right).$$

Similarly, in the case of low-side injection:

$$Tx = \frac{n(1 - f_{IF}/f_{LO})}{2f_{LO}}$$

And for this low-side injection case: $n_{RF}=\text{round}(n(1-f_{IF}/f_{LO}))$.

Figure 3B:
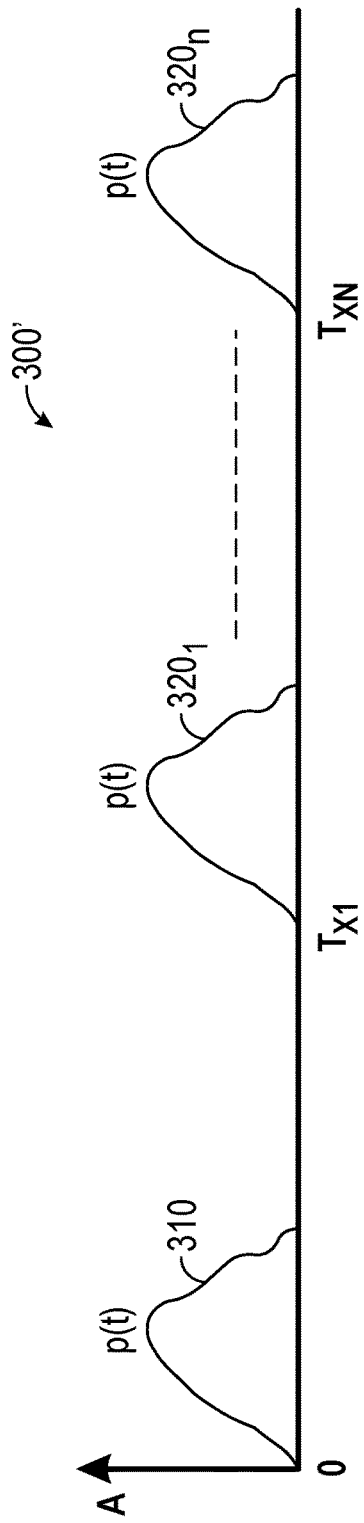
FIG. 3B is a graphical illustration of a generalized view of pulse sequencing as described herein.

Referring now to FIG. 3B, shown is a graphical illustration of a generalized view of pulse sequencing as described herein. More specifically, in FIG. 3B, a pulse sequence 300' having a set of pulses 310, $320_1$-$320_n$ is provided. In this generalized view, it is possible that more than two pulses are provided, each separated from the preceding pulse by a pulse separation interval, $T_{X1}$-$T_{XN}$, where each of these pulse separation intervals may be substantially identical or may vary depending upon embodiment.

With the multiple sequence of pulses illustrated in FIG. 3B, the Fourier transform of the sequence of identical pulses is:

$$P_{overall}(j\omega)=P(j\omega)*[1+e^{-j\omega T_{X1}}+ \ldots +e^{-j\omega T_{XN}}].$$

With proper design of the value of $T_{Xi}$, an overall shaping filter with notches or regions of large attenuation can be created (essentially, an FIR filter can be created to arbitrarily shape the spectrum). Note however that this filtering operation is not an express filter within or used by the DC-DC converter. Instead, the control logic that generates a pulse sequence according to this determined pulse separation intervals enables this filtering to occur at RF frequencies by noise cancellation effected by control of the pulse separation interval.

In still further cases, note that one or more of these pulses may be of different amplitudes. In such cases, the Fourier transform of the sequence of similarly shaped pulses is:

$$P_{overall}(j\omega)=P(j\omega)*[1+A_1 e^{-j\omega T_{X1}}+ \ldots +A_N e^{-j\omega T_{XN}}].$$

With proper design of the value of $T_{Xi}$, and relative amplitude of pulses $A_i$, an overall shaping filter with notches or regions of large attenuation can be created (as described above essentially, an FIR filter can be created to arbitrarily shape the spectrum).

In a PFM DC-DC converter, although it is theoretically possible to control the relative amplitude of the pulses, it may not be practical or the preferred embodiment; therefore, a control technique as described herein in which substantially identical pulses with precise delays are provided may be used.

Thus embodiments provide a PFM DC-DC comparator that creates spectral nulls at desired locations in the RF (or other) frequency band with arbitrary transient current waveform pulses, provided that a predetermined number of substantially identical pulse(s) follow the initial pulse after a predetermined and fixed delay interval. In a specific case, a single pulse may follow an initial pulse with a delay that has a prescribed relationship to the LO frequency in order to place a null at or near the LO frequency and/or its harmonics. Of course, as described above, the delay between pulse pairs need not be identical for all pulse pairs, but a notch is still created at the desired frequency provided that the delay has a prescribed relationship to the local oscillator frequency. Superior interference suppression at a given frequency can be achieved if the duration (and shape) of each individual current pulse is of a controlled duration. The delay between pulses may be derived from a known clock source (e.g. LO frequency), duration of pulse (and its shape) and delay between pulses can be derived from independent clock sources to create spectral nulls at frequencies related in a known way to each of these clock sources. While the pulse pairing technique described herein is with regard to PFM DC-DC converters, understand that embodiments are applicable to various systems that have repetitive transient responses. If transient responses are substantially identical each time, then restricting start times of transients (with pulse-to-pulse delay) can eliminate noise in a desired frequency band. One such example could be a general purpose input output (GPIO) output signal that creates a clock signal.

Figure 4:
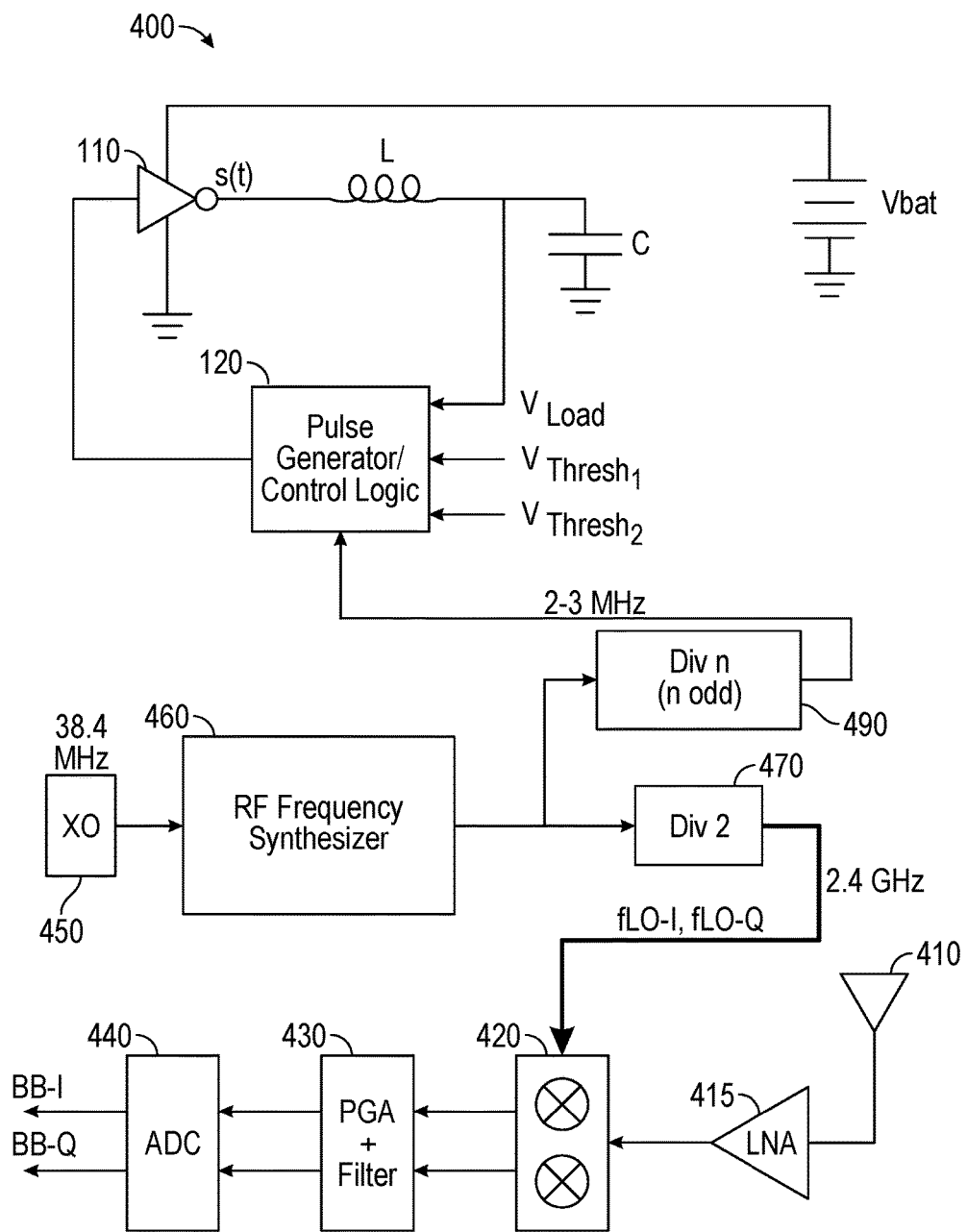
FIG. 4 is a block diagram of a system in accordance with an embodiment.

Referring now to FIG. 4, shown is a block diagram of a system in accordance with an embodiment. More specifically, FIG. 4 shows a radio receiver system 400 that includes a DC-DC converter as described herein. More specifically, receiver system 400 receives an RF signal via an antenna 410, which provides the RF signal to a low noise amplifier 415 that increases a signal level of the RF signal and provides it to a mixer 420. In the embodiment shown, mixer 420 is a complex mixer configured to downconvert the RF signal to a given IF frequency. As illustrated, mixer 420 also receives quadrature mixing signals $f_{LO-I}$ and $f_{LO-Q}$.

As illustrated, the downconverted IF signals are output from complex mixer 420 and are provided to a programmable gain amplifier 430, which may also implement an IF filter. The resulting processed signals are provided to an analog-to-digital converter 440, where the signals are digitized and output as baseband complex signals, namely BB-I and BB-Q.

In the embodiment shown, the LO or mixing signal may be generated at a frequency of 2.4 GHz. This signal is output by a frequency divider 470 (which may be implemented as a divide by 2 divider) that in turn receives a RF signal output from a frequency synthesizer 460, which in turn receives an incoming reference clock signal generated by a crystal oscillator 450 and generates the RF signal therefrom. As illustrated, this RF signal (which in an embodiment may be output at 4.8 GHz) is provided to another divider 480, which in an embodiment may be a configurable divider to divide this RF signal by a programmable value N (where N is a given odd integer value), e.g., derived in accordance with the equations described above. In the specific embodiment shown, divider 480 may output a clock signal at 2-3 MHz that in turn is provided to pulse generator/control logic 120. In an embodiment, this clock signal may define where the second pulse in the pair occurs. This clock may be configured as a sample clock or as a two-way system where the output of a comparator of the DC-DC converter requests to put out a pulse pair and then obtains the timing interval from the clock source.

Understand that in the embodiment shown in FIG. 4, receiver system 400 may be implemented as a single die integrated circuit where all components, other than the battery, antenna and crystal oscillator are implemented on a single semiconductor die. Of course other implementations are possible. And furthermore while only a receiver circuit is shown, understand that the resulting baseband quadrature signals can be further processed, e.g., in a demodulator, which may be present within the same integrated circuit or another component of a system. Furthermore, while a receiver path is shown, in some cases system 400 may further include an RF transmitter which may also be implemented on the single semiconductor die.

Figure 5:
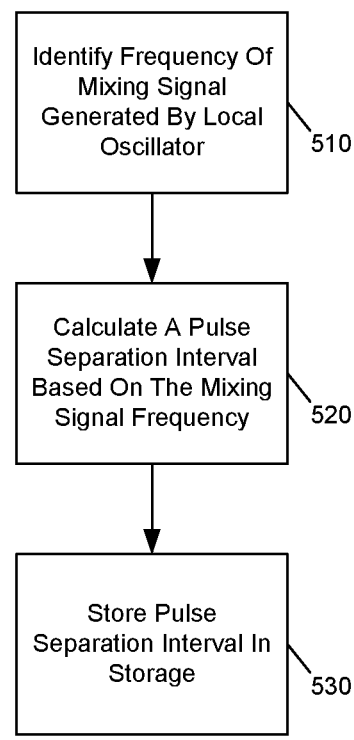
FIG. 5 is a flow diagram of a method in accordance with an embodiment.

Referring now to FIG. 5, shown is a flow diagram of a method in accordance with an embodiment. More specifically, method 500 of FIG. 5 may be performed by a control logic of a radio receiver to determine a pulse separation interval as described herein. In other cases, note that method 500 may be performed during manufacturing activities, based on design characterization, field testing or so forth to identify appropriate pulse separation intervals at a variety of frequency bands to generate and store a table in a storage of the radio receiver to enable pulse control operations as described herein.

In any event, as illustrated method 500 begins by identifying a frequency of a mixing signal generated by a local oscillator (block 510). This mixing signal frequency may be determined based on control of the local oscillator, which generates a given LO signal to downconvert incoming RF signals, e.g., based on a RF channel of interest, and/or a desired IF frequency. Next, control passes to block 520 where a pulse separation interval can be calculated based on this mixing signal frequency. In an embodiment, the pulse separation interval may be determined according to:

$$T_X = \frac{n}{2f_{LO}}.$$

Note that in other cases, the pulse separation interval may further be determined based on the IF frequency according to:

$$T_X = \frac{n}{2(f_{LO} + f_{IF})},$$

for low-side injection. Thereafter, control passes to block 530 where this pulse separation interval may be stored in a storage, such as a register or other configuration storage accessible by the control logic. Note that although shown at this high level in the embodiment of FIG. 5, many variations and alternatives are possible. For example, instead of dynamically calculating a pulse separation interval during receiver operation, instead a lookup table storing multiple entries each associating, e.g., a frequency of a channel of interest and a corresponding pulse separation interval may be accessed. As an example, such lookup table can be accessed based on an identification of a desired channel.

Figure 6:
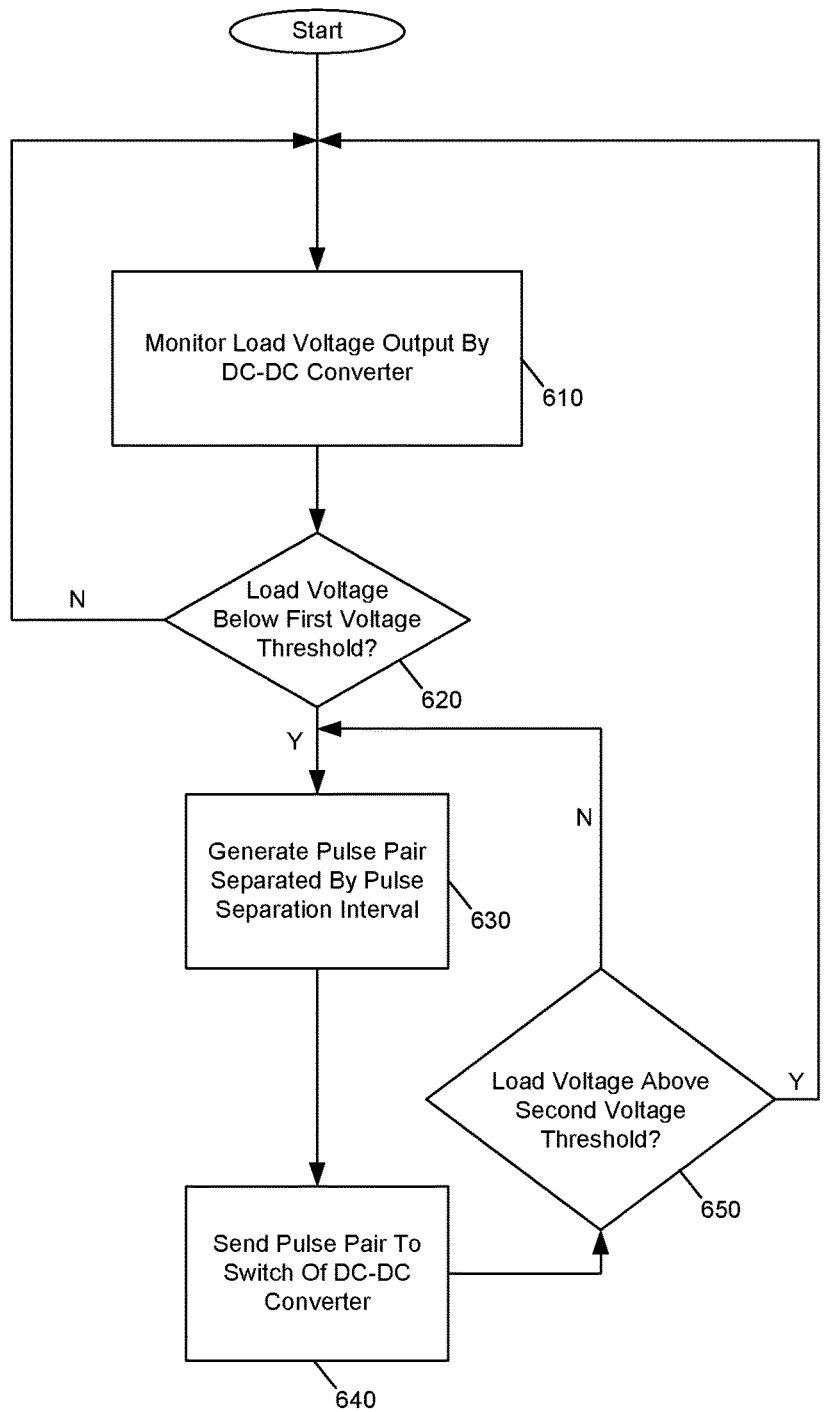
FIG. 6 is a flow diagram of a method in accordance with another embodiment.

Referring now to FIG. 6, shown is a flow diagram of a method in accordance with another embodiment. More specifically, method 600 of FIG. 6 details control operations for a DC-DC converter as described herein. As illustrated, method 600 begins by monitoring a load voltage output by the DC-DC converter (block 610). As an example, a feedback loop can receive the load voltage and compare it to a given threshold.

More specifically, as illustrated at diamond 620 it can be determined in such comparator whether this load voltage is below a first voltage threshold. In an embodiment, understand that this first threshold voltage may be a low threshold level. If the load voltage is above this first threshold voltage, no further operation occurs for this comparison cycle. Accordingly, control passes back to block 610, for another iteration of method 600, e.g., according to a comparator sampling frequency.

Still with reference to FIG. 6, if it is determined that the load voltage falls below the first voltage threshold, control passes to block 630 where a pulse pair as described herein is generated. More specifically, this pulse pair may be generated with a pulse separation interval between the two pulses. Understand that the time duration of this pulse separation interval may be determined according to one or more of LO frequency and/or an IF frequency (which in turn may be determined based at least in part on a desired channel). Next, control passes to block 640 where the pulse pair is sent from the control logic to a switch of the voltage converter, such as an inverter or one or more MOSFETs to enable a source voltage such as a battery voltage to couple to an inductor of the DC-DC converter. Next after both pulses have been generated such that the inductor current linearly increases and decreases (to a zero Ampere level) twice, control passes to diamond 650 to determine whether the load voltage is above a second voltage threshold. Understand that this second threshold voltage may be at a higher level than the first threshold voltage level to provide a measure of hysteresis. If it is determined that the load voltage is above the second threshold level, no further control operations occur for this comparison cycle, and control passes back to block 610. Otherwise if it determined that the load voltage is not above the second voltage threshold, at least one additional pulse pair may be generated (and where these pulses are separated by the pulse separation interval). Understand while shown at this high level in the illustration of FIG. 6, many variations and alternatives are possible. Note further that the methods described in FIGS. 5 and 6 may be performed in a given microcontroller, processor, or other programmable logic circuitry in response to execution of one or more instructions stored in one or more non-transitory storage media.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a pulse frequency modulation (PFM) voltage converter to receive a first voltage and provide a second voltage to a load, the PFM voltage converter having an inductor to store energy based on the first voltage and a switch controllable to switchably couple the first voltage to the inductor; and
a pulse generator to generate at least one pulse pair formed of a first pulse and a second pulse substantially identical to the first pulse, the second pulse separated from the first pulse by a pulse separation interval, when the second voltage is less than a first threshold voltage, wherein the at least one pulse pair is to control the switch, the pulse separation interval a predetermined value determined without reference to a determination that the second voltage is less than the first threshold voltage.

2. The apparatus of claim 1, wherein the pulse separation interval is based at least in part on a frequency of a mixing signal output by a local oscillator (LO) of the apparatus, wherein the apparatus comprises a radio receiver to receive and downconvert a radio frequency (RF) signal to a second frequency signal using the mixing signal.

3. The apparatus of claim 2, wherein the pulse separation interval is according to:
$N/2f_{LO}$, wherein N is an odd integer and $f_{LO}$ is the mixing signal frequency.

4. The apparatus of claim 2, wherein the pulse separation interval is according to:
$\text{Round}(N(1+f_{IF}/f_{LO}))$, wherein N is an odd integer, $f_{IF}$ is an intermediate frequency, and $f_{LO}$ is the mixing signal frequency.

5. The apparatus of claim 2, wherein the at least one pulse pair is to reduce interference of the first pulse and the second pulse substantially around one or more of the mixing signal frequency and the RF signal.

6. The apparatus of claim 5, wherein the second pulse is to cancel the interference of the first pulse substantially around the one or more of the mixing signal frequency and the RF signal.

7. The apparatus of claim 1, wherein the pulse generator is to generate a plurality of pulse pairs, until the second voltage exceeds a second threshold voltage, the second threshold voltage greater than the first threshold voltage.

8. The apparatus of claim 7, wherein the pulse separation interval for one or more of the plurality of pulse pairs is different than a second pulse separation interval for at least another pulse pair of the plurality of pulse pairs.

9. The apparatus of claim 1, further comprising a storage to store a table having a plurality of entries each to associate a radio frequency (RF) frequency with a pulse separation interval.

10. The apparatus of claim 9, further comprising a control logic to:
access the table based at least in part on identification of a requested RF channel to determine the pulse separation interval; and
control the pulse generator using the pulse separation interval.

11. The apparatus of claim 1, wherein the pulse generator is to generate a second pulse pair formed of a third pulse and a fourth pulse, the fourth pulse separated from the third pulse by the pulse separation interval, wherein a time duration between the at least one pulse pair and the second pulse pair is based on the second voltage and is not a predetermined value.

12. At least one non-transitory computer readable storage medium comprising instructions that when executed enable a system to:
responsive to a determination that a load voltage provided to a radio frequency (RF) circuit from a DC-DC converter is below a first threshold voltage, generate a first pulse of a switching signal and a second pulse of the switching signal, the second pulse separated from the first pulse by a pulse separation interval; and
send the first pulse of the switching signal and the second pulse of the switching signal to a switch of the DC-DC converter to enable a source voltage to be coupled to an inductor of the DC-DC converter, wherein the pulse separation interval is based at least in part on a desired channel frequency and not responsive to the determination that the load voltage is below the first threshold voltage.

13. The non-transitory computer readable storage medium of claim 12, further comprising instructions that when executed enable the system to calculate the pulse separation interval based at least in part on a frequency of a local oscillator signal output by a local oscillator of the RF circuit.

14. The non-transitory computer readable storage medium of claim 13, further comprising instructions that when executed enable the system to calculate the pulse separation interval further based on an intermediate frequency to which an RF signal of the desired channel frequency is downconverted by the local oscillator signal.

15. The non-transitory computer readable storage medium of claim 14, further comprising instructions that when executed enable the system to calculate the pulse separation interval according to:

$$Tx = \frac{n\left(1 + \frac{f_{IF}}{f_{LO}}\right)}{2f_{LO}},$$

wherein n is an odd integer, $f_{LO}$ is the frequency of the local oscillator signal and $f_{IF}$ is the intermediate frequency.

16. The non-transitory computer readable storage medium of claim 12, further comprising instructions that when executed enable the system to access a lookup table based on the desired channel frequency to determine the pulse separation interval.

17. The non-transitory computer readable storage medium of claim 12, further comprising instructions that when executed enable the system to generate a third pulse of the switching signal and a fourth pulse of the switching signal responsive to a determination that the load voltage is above the first threshold voltage and below a second threshold voltage and send the third pulse of the switching signal and the fourth pulse of the switching signal to the switch of the DC-DC converter.

18. The non-transitory computer readable storage medium of claim 17, wherein the third pulse is separated from the second pulse by a time duration different than the pulse separation interval.

19. An integrated circuit comprising:
- a radio receiver to receive, process and downconvert a radio frequency (RF) signal including an RF channel of interest to a second frequency signal using a mixing signal;
- a digital processor to digitally process the second frequency signal; and
- a DC-DC converter including a storage device, the DC-DC converter to provide a voltage to the radio receiver, wherein the DC-DC converter includes a control circuit, when the voltage is less than a threshold voltage, to generate at least one pulse pair formed of a first pulse and a second pulse substantially identical to the first pulse, the second pulse separated from the first pulse by a pulse separation interval, to cause a source voltage to charge the storage device, the pulse separation interval a predetermined value based at least in part on one or more of the RF channel of interest and the mixing signal, wherein the pulse pair is to reduce interference at one or more of the RF channel of interest and the mixing signal.

20. The integrated circuit of claim 19, further comprising:
- a storage to store a table having a plurality of entries each to associate a RF channel of interest with a pulse separation interval; and
- wherein the control circuit is to access the table based at least in part on the RF channel of interest to determine the pulse separation interval.

* * * * *